June 4, 1968  J. H. NADEAU  3,386,482
PORTABLE ROTARY CUT-OFF SAW WITH GUIDE MEANS FOR
ACCURATELY LOCATING A WORKPIECE THEREUPON
Filed Jan. 11, 1966  2 Sheets-Sheet 1
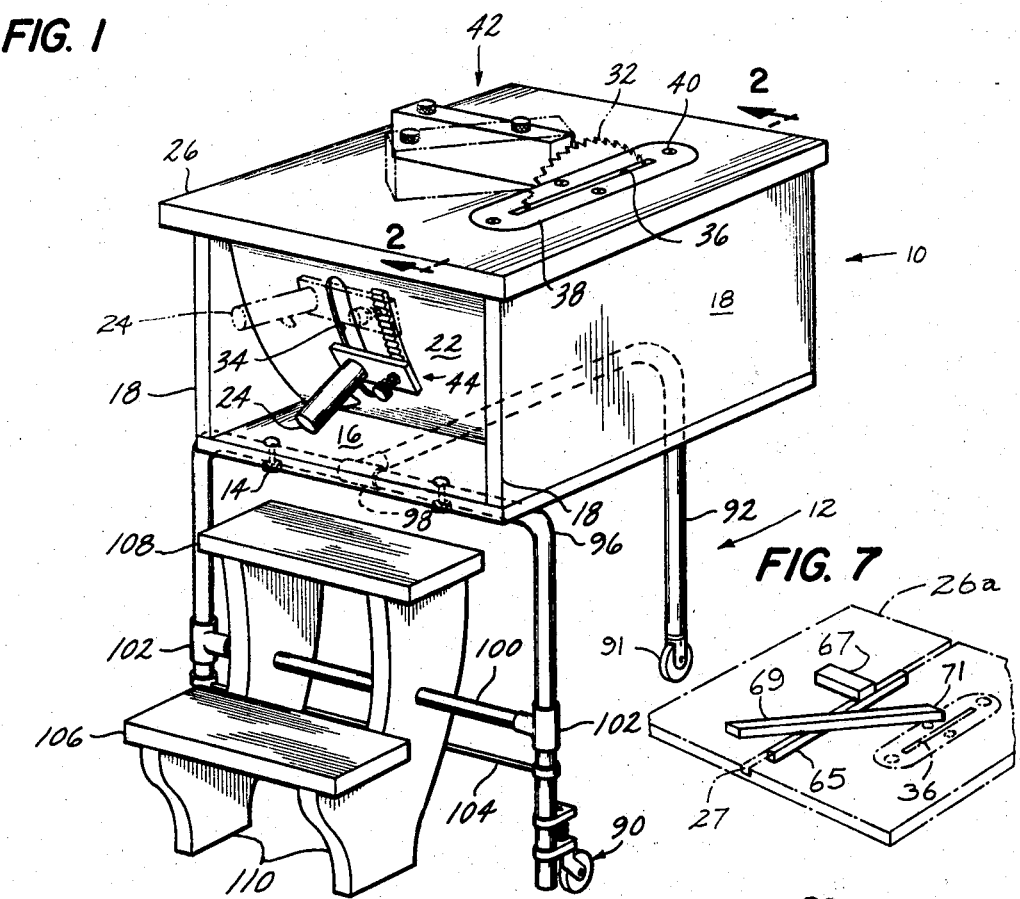
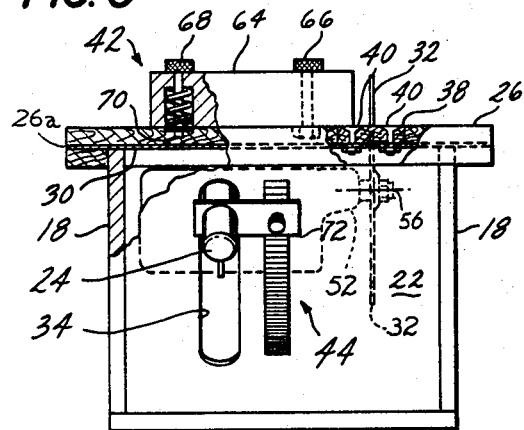
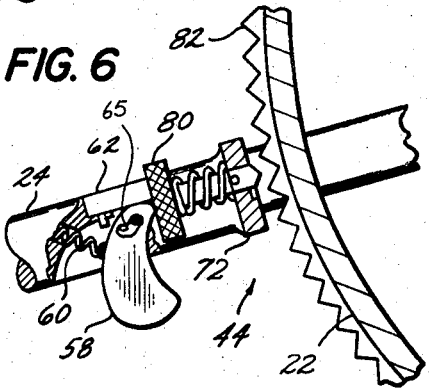
INVENTOR.
JAMES H. NADEAU
BY
McCormick, Paulding & Huber
ATTORNEYS June 4, 1968 J. H. NADEAU 3,386,482
PORTABLE ROTARY CUT-OFF SAW WITH GUIDE MEANS FOR
ACCURATELY LOCATING A WORKPIECE THEREUPON
Filed Jan. 11, 1966 2 Sheets-Sheet 2
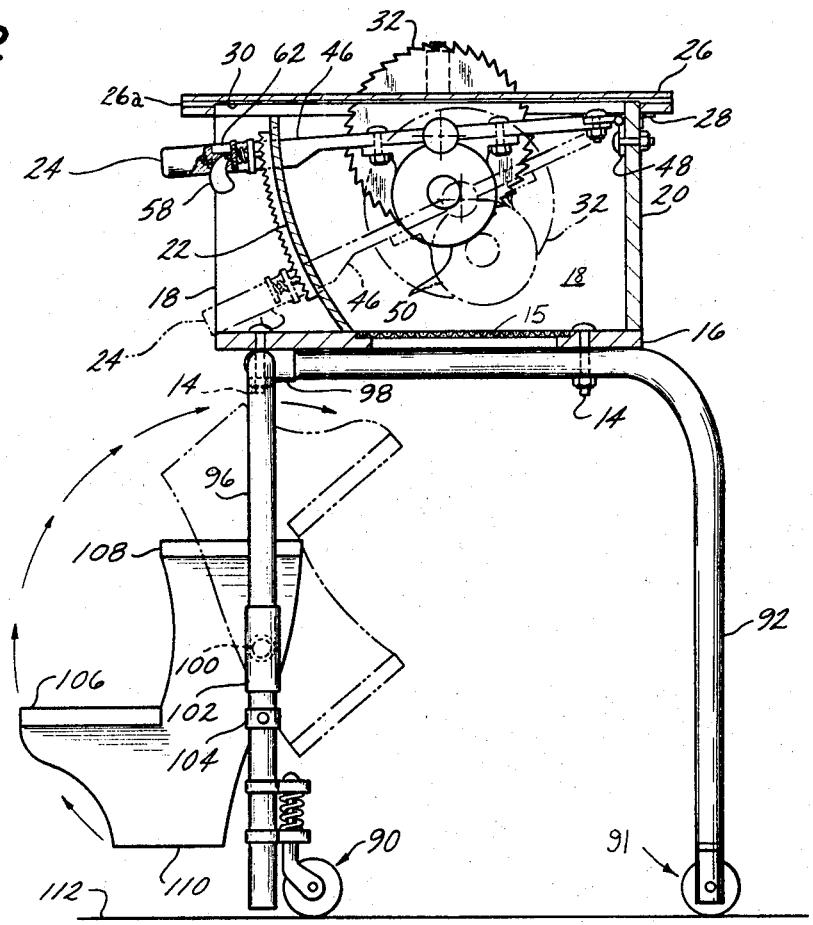
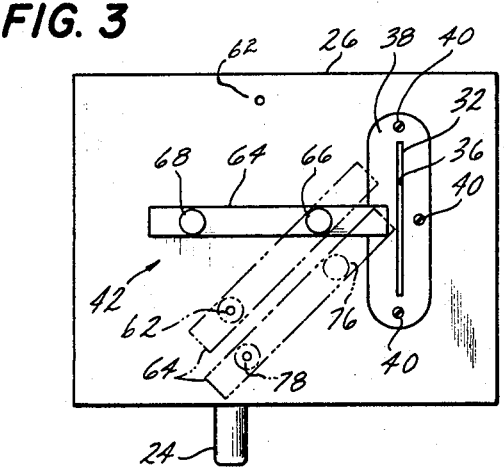
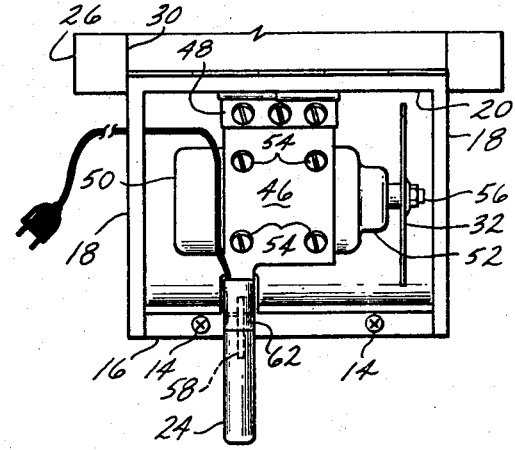

United States Patent Office 3,386,482
Patented June 4, 1968

3,386,482
PORTABLE ROTARY CUT-OFF SAW WITH GUIDE MEANS FOR ACCURATELY LOCATING A WORKPIECE THEREUPON
James Harold Nadeau, 271 Zion St., Hartford, Conn. 06106
Filed Jan. 11, 1966, Ser. No. 519,914
12 Claims. (Cl. 143—41)

ABSTRACT OF THE DISCLOSURE

A power saw unit having an electric motor with speed reducing means for the rotary saw blade to permit approximately one half the blade to be raised above the work surface. The motor is mounted on a lever which serves as a handle for raising the blade.

This invention relates to rotary cut-off saws and deals more particularly with a rotary cut-off saw in which the blade is swingable upwardly through the stationary top of a table while the workpiece is held thereon in a position which can be accurately located prior to raising the saw blade for the cut-off operation.

A general object of the present invention is to provide a rotary cut-off saw with suitable guide means for accurately locating a workpiece with respect to the path of movement of the saw blade.

Another general object of the present invention is to provide a rotary cut-off saw which is compact enough to be truly portable, and which may be readily attached to a bench or the like, or to a novel stepladder of the present invention.

Still another general object of the present invention is to provide a rotary cut-off saw which has a minimum number of moving parts and hence is both economical to manufacture and inexpensive to maintain.

A more specific object of the present invention is to provide a rotary cut-off saw of the foregoing character in which the upwardly swingable saw blade can be locked in any one of several positions to permit the device to be used as a conventional table saw.

Another specific object of the present invention is to provide a rotary cut-off saw of the foregoing character in which a trigger-type on/off switch is provided on a manually operated handle used to raise the saw blade.

Still another specific object of the present invention is to provide a rotary cut-off saw of the foregoing character wherein the stationary table top defines a slot through which the saw blade can be raised, which slot can be very accurately located with respect to said blade.

The drawings show preferred embodiments of the invention and such embodiments will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a perspective view of a rotary cut-off saw constructed in accordance with the present invention which saw is shown mounted on a novel stepladder arrangement of the present invention.

FIG. 2 is a side view of the device shown in FIG. 1 with the rotary cut-off saw and its enclosure shown in vertical cross section.

FIG. 3 is a top plan view of the cut-off saw shown in FIG. 1 with a portion of the workpiece guide means being shown in two alternative positions as indicated by the broken lines.

FIG. 4 is a plan view of the FIG. 1 device showing the table top or cover portion of the enclosure in an open position.

FIG. 5 is an elevational front view of the rotary cut-off saw shown in FIG. 1 with a portion thereof shown in section to better reveal its internal construction.

FIG. 6 is a view of the locking device shown in FIG. 5 and drawn to a somewhat enlarged scale.

FIG. 7 is a perspective view of an alternative form of the workpiece guide means, the table top being shown in broken lines.

Referring now to the drawings in greater detail, and more particularly to FIG. 1 thereof, a rotary cut-off saw assembly 10 of the present invention is there shown mounted on a three-legged supporting structure 12 by a plurality of bolts 14, 14. While the supporting structure 12 represents a preferred form of the present invention, it will be apparent from the description to follow that the saw assembly 10 could also be attached or placed upon a conventional workbench or the like.

The rotary cut-off saw assembly 10, comprises a generally rectangular enclosure having a flat bottom portion 16 which can be bolted to the supporting structure 12 as shown at 14. An open mesh screen 15 is preferably provided in the bottom portion to allow excess sawdust to drop to the floor as shown in FIG. 2. Two upstanding side walls 18, 18 are attached along their lower edges to the bottom portion 16 and are joined along their rear edges by a rear wall 20 best shown in FIG. 2. The forward edges of the side walls 18, 18 are preferably flush with the bottom portion 16 as best shown in FIG. 1, and a recessed arcuate front wall 22 of the enclosure cooperates with the side walls to define a suitable recess in which a handle 24, to be described, is conveniently received.

The enclosure also includes a generally horizontal top 26 hingedly connected to the rear wall 20, as best shown in FIG. 2, by an elongated piano-type hinge 28. The top 26 has a flat upper surface for supporting a workpiece or the like to be cut while the underside of the top 26 defines a rectangular recess 30 for snugly engaging the upper marginal edge portions of the side and rear walls as best shown in FIGS. 2 and 5. As shown the top 26 is of laminated construction having a center portion 26a of metal or the like to provide rigidity at no sacrifice in thickness. It will be apparent that the top 26 could also be cast of aluminum or the like as is a conventional practice in the manufacture of powered table saws.

Referring now to FIGS. 2 and 4 of the drawings, the internal parts of the cut-off saw assembly are thereshown in greater detail. More particularly, the handle 24 will be seen to comprise a free end portion of a lever arm 46, which arm is pivotally connected to the rear wall 20 adjacent the recessed underside of the top 26 by a conventional hinge 48. The lever arm 46 carries a depending electric motor 50, which motor includes a speed reducing gear box 52 drivingly connected to the motor shaft as best shown in FIG. 4. The electric motor 50 is attached to the lever arm 46 intermediate the free and the pivoted ends thereof by a plurality of bolts 54, 54 so that the gear box output shaft 56 lies close to the upper surface of the lever 46 as best shown in FIG. 2. The circular saw blade 32 is attached to the output shaft 56 in a conventional manner as best shown in FIGS. 4 and 5. As so constructed, the saw blade 32 has a major portion of its surface projecting above the top surface of the table top 26 when the handle 24 is in the raised position shown in FIGS. 2 and 5. In the down position, shown in broken lines in FIG. 2, the saw blade 32 is contained wholly inside the enclosure and the handle 24 is contained in the above-described recess.

It will be noted that the lever 46 is urged by gravity to its lowered position. Thus, the saw blade is normally located below the table top and is only raised when the user raises the handle. This feature represents a very important safety feature of the present invention.

Still with reference to FIG. 1, the handle 24 will be seen to be movable from the lowered position shown in solid lines to a raised position as indicated by the broken lines. The latter handle position corresponds to a saw blade raised position as indicated by the broken lines at 32. The front wall 22 of the enclosure defines a slotted guide opening 34 in which the handle 24 is adapted to move and the top 26 defines a suitable saw slot 36 through which the saw blade 32 is slidably received when said blade is raised in response to upward movement of the handle 24. Preferably, and as shown, the saw slot defining portion of the top 26 comprises a plywood or plastic insert 38 which is held in place by a plurality of screws 40, 40. As so constructed, the saw slot 36 can be accurately cut with the insert 38 mounted in position in the top 26 by a simple upward movement of the handle 24. It will be apparent that a very narrow saw slot can thus be quite accurately located in the top 26. With such a slot 36 a workpiece to be cut on the table top 26 can be accurately located thereon without the conventional power saw practice of having to raise the saw blade 32 prior to the actual cutting operation to assure that the workpiece is properly positioned with respect to the saw blade. A suitable workpiece guide, indicated generally at 42, is also provided in order to assure that the piece to be cut is arranged at a particular angle to the saw blade path. The guide 42 will be described in greater detail hereinbelow with reference to FIGS. 3 and 5. An alternative workpiece guide construction is shown in FIG. 7.

Finally, and still with reference to FIG. 1, a locking device 44 is provided on the handle 24 in order to secure the handle 24, and the blade 32, in any predetermined position between the up and the down positions just described. The locking device 44 will be described in greater detail hereinbelow with reference to FIG. 6.

Preferably and as shown in FIGS. 2 and 6, a trigger 58 is pivotally received in a downwardly open recess defined by the handle 24. A compression spring 60 acts between the trigger 58 and the handle 24 to urge the trigger downwardly toward an off position. An on/off switch 62 is also contained in the handle 24 and is electrically connected to the motor and to a power cord 64 as shown in FIG. 4. The switch 62 has a depending plunger which is engageable by the trigger 58 to control the operation of the electric motor 50 and the circular saw blade 32. Preferably and as shown, the trigger mechanism includes suitable means for locking the trigger in the on position as is conventional practice in the field of power driven hand-held electric drills or the like. In the illustrated embodiment said means comprises a slot 65 in the trigger 58, which slot defines a detent adjacent its lower end for releasably receiving the fixed pivot pin upon which the trigger 58 is mounted. It will be apparent that upward and inward movement of the trigger will cause the trigger to hold the switch on against the bias of the trigger return spring 60.

Referring now to the workpiece guide 42, best shown in FIGS. 3 and 5, several alternative positions of said guide are depicted in FIG. 3, the position shown in solid lines being used for a right angle cut-off of the workpiece. The workpiece guide 42 comprises an elongated member 64 which is pivotally connected to the table top 26 by a bolt 66 threadably received in the table top. The guide member 64 is preferably high enough to accommodate a workpiece having an elongated cross-sectional shape when said workpiece is placed on edge upon the top 26. A plunger 68 extends through the member 64 and is releasably engageable with a detent indicated at 70 and defined in the table top 26 as shown in FIG. 5. The plunger 68 is spring-loaded toward the position shown, but has a knurled head portion which permits the plunger to be withdrawn so that the guide member 64 can be pivoted toward the alternative position shown in broken lines in FIG. 3. Either of the two plunger detents 62, 62 defined in the table top 26 will allow the guide member 64 to be located at approximately a 45° angle to the cut-off blade 32. It will be apparent that as the outer end of the guide member 64 is rotated to one or the other of these positions, its inner end moves away from the saw blade so that a relatively narrow workpiece to be cut on edge might not be able to be so cut as a result of the rather shallow height of the saw blade 32 at the location of the cutting. In order to avoid this dilemma, the threaded pivot bolt 66 can be placed in an alternate threaded opening, indicated at 76 in FIG. 3, which opening permits the guide member 64 to be located with its inner end adjacent the midpoint of the saw blade 32 as shown. An alternate pivot pin detent 78 is also provided to hold the guide member 64 in the 45° position with respect to the saw blade 32. As so constructed and arranged, the narrow saw slot 36 in combination with the adjustable guide member 64 provides a very convenient guide means against which the workpiece to be cut is held by the user of the saw, whether he is cutting off a piece of trim in a flat position, or on edge, at either a right angle, or a 45° angle.

FIG. 7 shows a workpiece guide of alternative construction for use on a table top 26a having a groove 27 arranged parallel to the saw blade slot 36 as shown. Preferably, the guide comprises a lower member 65, which is slidably received in the slot 27, and two workpiece engageable members 67 and 69 rigidly attached to spaced points on the lower member 65 as shown. The first mentioned member 67 is preferably located at 90° to the lower member 65 and cooperates with an angled end portion 71 of the member 69 to define a right angle cut-off guide having its inner end located in closely spaced relation to the saw slot 36. The member 69 is fixed to the lower member 65 in spaced relation to the member just described and forms a 45° angle with said lower member 65. It will be apparent that the guide of FIG. 7 can be used to cut off trim or molding at either a 45° or 90° angle without having to reset the same in the manner required of the workpiece guide 42 described hereinabove with respect to FIGS. 1, 3 and 5.

Referring now to FIG. 6 wherein the locking device 44 is shown in greater detail, the handle portion 24 of the lever arm 46 will be seen to include a laterally extending bar 72 in which a spring-loaded plunger 80 is slidably received so as to be engageable with any one of a plurality of detents defined in a strip 82 attached to the forward face of the arcuate front wall 22 as shown. The plunger 80 includes a knurled head portion and a bayonet type locking device at its inner end so that the inner end of the plunger 80 can be held in engagement with any one of a plurality of detents defined in the strip 82 by a simple quarter turn movement of the knurled head. This device would normally be used only for ripping relatively long lumber, and it will be apparent that in the anticipated use of the construction shown, namely cutting off, molding or trim, this locking device would not be required.

Turning now to the construction of the support structure 12, best shown in FIGS. 1 and 2, this structure preferably comprises a three-legged tubular framework with two of the three legs located at the front of the device. At least the two front legs carry a pair of weight-sensitive casters indicated generally at 90, 90. The third or rear leg comprises an inverted L-shaped member 92, and may have a caster 91 carried in its lower end as best shown in FIG. 2. The two front legs are defined by an inverted U-shaped member 96 which is attached at its midpoint to the upper end of the member 92 by a welded T construction as indicated at 98. The lower portion 16 of the enclosure is preferably attached to both these tubular members 92 and 96 as indicated by the bolts 14, 14. Although the supporting structure shown comprises a bent rear leg 96, it will be apparent that other types of leg structures might be employed. For example, the legs might comprise straight vertical pipe members threadably received in threaded sockets defined in the underside of the enclosure bottom 16.

The above-mentioned stepladder means carried by the crossbar 100 preferably defines at least one upwardly facing step subadjacent the handle 24 and located generally between the two front legs defined by the U-shaped member 96. More particularly, the stepladder preferably comprises at least two vertically spaced steps 106 and 108 which steps are held in vertically spaced staggered relation by a pair of stringers 110, 110. The stringers 110, 110 support the steps 106 and 108 in a conventional manner as shown and aligned openings are provided in the stringers to receive the crossbar 100. The secondary crossbar 104 engages a rearwardly facing edge of the stringers so as to support the stepladder in the extended position shown in FIGS. 1 and 2. As so constructed and arranged, the user of this device need only exert a slight downward force on the lowermost step 106, as for example with his foot, and the weight-sensitive casters 90, 90 will compress so that the lower ends of the member 96 touch the floor 112. It will thus be apparent that the device can be easily maneuvered about on the casters 90, 90 and the caster 91. When the device is positioned in the proper place, it will be automatically locked in place on the floor when the user steps upon the lowermost step 106 as described above.

Finally, the stepladder can be rotated from the active position shown in full line in FIG. 2 to a stored position indicated generally by the broken lines of that figure. The tubular crossbar 100 serves as a convenient pivot axis about which the stepladder can be rotated between these two positions. In the stored position, wherein the stepladder is located under the enclosure and between the three legs of the support structure 12, it will be seen that the rear edge of the stringers 110, 110 again engage the lowered crossbar 104 to hold the stepladder in position.

The invention claimed is:

1. A cut-off saw comprising a hollow enclosure structure, a top for said enclosure which top defines a saw slot therein, a lever arm in said enclosure having one end hingedly connected to said enclosure defining structure for pivotal movement about a hinge axis arranged perpendicular to said saw slot and parallel to said top, a free end of said lever arm extending outside of said enclosure and defining a handle for moving said lever arm, an electric motor supported on said lever intermediate said pivoted and free ends thereof, a circular saw blade drivingly connected to said motor and adapted for pivotal movement along an arcuate path substantially coextensive with the path of movement of said motor between a raised position wherein said blade is arranged in said slot with a substantial portion thereof located above the surface of said top and a lowered position wherein said saw blade is wholly contained inside said hollow enclosure, and speed reducing means drivingly connecting said electric motor to said saw blade so that the axis of rotation of the latter is located adjacent the periphery of said motor and adjacent an underside of said top when said motor and blade are in said raised position.

2. A cut-off saw as set forth in claim 1 and further characterized by an electric switch carried by said handle portion for selectively connecting said electric motor to a source of electrical energy, and a locking device carried by said handle portion and engageable with the arcuate front portion of said enclosure to retain said lever arm in any one of a plurality of positions corresponding to various heights of said saw blade above the upper surface of said enclosure top.

3. A cut-off saw comprising in combination an open top box-like enclosure having parallel side walls and a rear wall attached thereto in perpendicular relation, a top for said enclosure, said top having an upper surface for supporting a workpiece, an arcuate front wall for said enclosure, a lever arm in said enclosure and having one end pivotally connected to said rear wall adjacent the underside of said top, a free end of said lever arm defining a handle which extends through a slotted guide opening in said front wall so as to be restricted to movement in a plane parallel to said side walls, an electric motor supported on said lever arm intermediate the pivoted and free ends thereof, gearing means carried by said electric motor and including an output shaft which is spaced upwardly from the shaft of said motor a distance corresponding approximately to one half the diameter of the motor, and a circular saw blade carried by said output shaft for movement upwardly through a saw slot defined in said enclosure top in response to upward movement of the handle.

4. A cut-off saw as set forth in claim 3 and further characterized by a trigger pivotally received in the handle portion of said lever arm, spring biasing means for urging said trigger toward an inactive position, and switch means responsive to movement of said trigger from said inactive position toward an active position, which means is electrically connected to said motor and to a source of electrical energy.

5. A cut-off saw as set forth in claim 3 and further characterized by a locking device carried by said handle portion and engageable with the arcuate front wall of said enclosure to retain said lever arm in any one of a plurality of positions corresponding to various heights of said saw blade above the upper surface of said top.

6. A cut-off saw as set forth in claim 3 wherein said top is hingedly connected to said rear wall, and wherein said top has an underside which defines a rectangular recess for snugly engaging the marginal upper edge portions of said rear and side walls when the top is closed.

7. A cut-off saw as set forth in claim 3 and further characterized by workpiece guide means on said top, which guide means is adjustably movable from and to at least two positions corresponding to a 90° and a 45° workpiece cut-off angle.

8. A cut-off saw as set forth in claim 7 wherein said saw slot defining portion of said top comprises an insert of easily cut material which is releasably fastened in said top where it can be cut with said saw blade to define said saw slot, said saw slot being thus very accurately located with respect to said blade further enhancing the accuracy of said workpiece guide means.

9. A cut-off saw as set forth in claim 3 and further characterized by workpiece guide means slidably received in a groove defined by said top, which means comprises two work engageable members arranged at 90° and 45° respectively to said saw slot, and wherein said saw slot defining portion of said top comprises an insert of easily cut material which is releasably fastened in said top where it can be cut with said saw blade to define said slot.

10. A cut-off saw comprising a support structure having three depending legs, an enclosure mounted on said support structure, a horizontal top for said enclosure, a lever arm pivotally mounted in said enclosure and including a handle portion which protrudes laterally outwardly through a slotted guide opening in said enclosure, an electric motor mounted on said arm for movement therewith, a vertically disposed circular saw blade driven by said motor and adapted for upward movement in its own plane through a saw slot in said top in response to upward movement of said handle portion, a pair of weight-sensitive casters carried by two of the three legs of said support structure and means defining at least one step between said two legs so that a downward force exerted by the user on said step causes all three legs to engage the floor on which the cut-off saw and its support structure are located.

11. A cut-off saw and support structure therefor as set forth in claim 10 wherein said step defining means comprises at least two vertically spaced steps, said means further comprising two laterally spaced stringers for supporting said steps in staggered relation, and a crossbar attached at its respective ends to one of said two legs and rotatably supporting said stringers so that said steps can be moved between a stored position generally under said enclosure between said three legs and an active position wherein said downward force can be conveniently exerted thereupon.

12. A cut-off saw and support structure therefor as set forth in claim 10 wherein said two caster carrying legs are located at the front of the resulting assembly subadjacent said handle portion.

References Cited

UNITED STATES PATENTS 2,937,672   5/1960   Gjerde.
3,285,303   11/1966   Kwiatkowki _____ 143—41 XR WILLIAM W. DYER, Jr., *Primary Examiner.*

W. D. BRAY, *Assistant Examiner.*